United States Patent
Nakamura et al.

(10) Patent No.: US 8,846,172 B2
(45) Date of Patent: Sep. 30, 2014

(54) LIGHT EMISSIVE CERAMIC LAMINATE AND METHOD OF MAKING SAME

(75) Inventors: Toshitaka Nakamura, Osaka (JP); Hironaka Fujii, Carlsbad, CA (US); Amane Mochizuki, Carlsbad, CA (US)

(73) Assignee: Nitto Denko Corporation, Osaka (JP)

( * ) Notice: Subject to any disclaimer, the term of this patent is extended or adjusted under 35 U.S.C. 154(b) by 213 days.

(21) Appl. No.: 13/274,048

(22) Filed: Oct. 14, 2011

(65) Prior Publication Data

US 2012/0094083 A1 Apr. 19, 2012

Related U.S. Application Data

(60) Provisional application No. 61/394,108, filed on Oct. 18, 2010.

(51) Int. Cl.
- B32B 3/14 (2006.01)
- C04B 35/638 (2006.01)
- B32B 18/00 (2006.01)
- C04B 35/634 (2006.01)
- C04B 35/44 (2006.01)

(52) U.S. Cl.
CPC ............. *B32B 18/00* (2013.01); *C04B 35/638* (2013.01); *C04B 2235/6581* (2013.01); *C04B 2235/3225* (2013.01); *C04B 2235/9653* (2013.01); *C04B 2235/9661* (2013.01); *C04B 2235/6025* (2013.01); *C04B 2235/6565* (2013.01); *B32B 2457/00* (2013.01); *C04B 2237/62* (2013.01); *C04B 2235/441* (2013.01); *C04B 2235/604* (2013.01); *C04B 2235/3409* (2013.01); *C04B 2235/764* (2013.01); *C04B 2237/343* (2013.01); *C04B 2235/663* (2013.01); *C04B 2237/704* (2013.01); *C04B 35/63488* (2013.01); *C04B 2235/5409* (2013.01); *C04B 2235/3229* (2013.01); *C04B 2235/6562* (2013.01); *C04B 35/44* (2013.01)

USPC .............................. 428/43; 438/113; 438/462

(58) Field of Classification Search
CPC ........................................................ H01L 21/78
USPC ..................................... 428/43; 438/113, 462
See application file for complete search history.

(56) References Cited

U.S. PATENT DOCUMENTS

| | | | |
|---|---|---|---|
| 5,169,804 A | 12/1992 | Schwartzbauer | |
| 5,998,925 A | 12/1999 | Shimizu et al. | |
| 6,069,440 A | 5/2000 | Shimizu et al. | |
| 6,900,079 B2 * | 5/2005 | Kinsman et al. | 438/127 |
| 7,129,150 B2 | 10/2006 | Kawai | |
| 7,361,938 B2 | 4/2008 | Mueller et al. | |
| 7,514,721 B2 | 4/2009 | Krames et al. | |
| 7,670,872 B2 | 3/2010 | Yan | |
| 8,278,674 B2 * | 10/2012 | Krames et al. | 257/98 |
| 2004/0145308 A1 | 7/2004 | Rossner et al. | |
| 2009/0108507 A1 | 4/2009 | Messing et al. | |
| 2010/0200808 A1 | 8/2010 | Hafiz et al. | |

FOREIGN PATENT DOCUMENTS

WO 2008/112710 A 9/2008

* cited by examiner

*Primary Examiner* — Alexander Thomas
(74) *Attorney, Agent, or Firm* — Law Office of Katsuhiro Arai

(57) ABSTRACT

Disclosed herein are a laminated composite and process for making the same. The laminated composite includes at least one wavelength-converting layer and at least one non-emissive layer, wherein a vertical relief gap pattern defines the composite into a plurality of discrete separable portions, and the discrete separable portions are breakably joined by a non-emissive layer. Separation along the relief gap pattern reduces color variation amongst the discrete portions and processes.

7 Claims, 3 Drawing Sheets

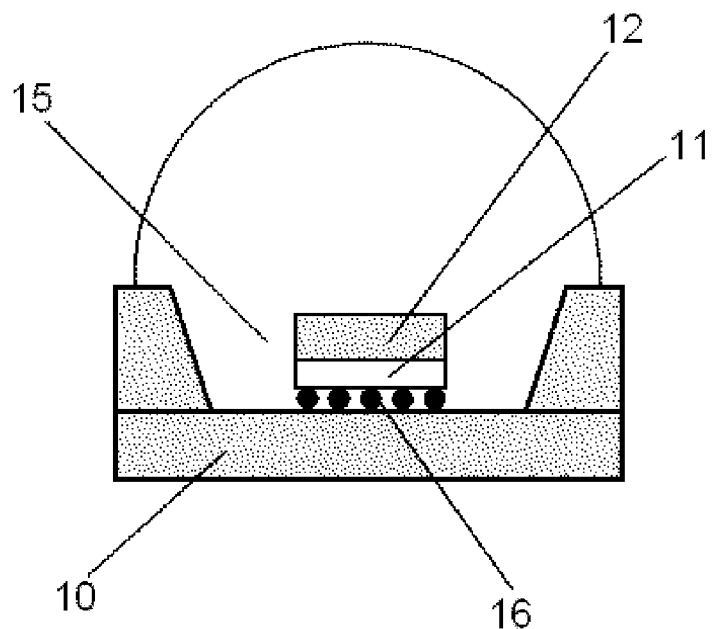
Fig. 1A *[Background Art]*
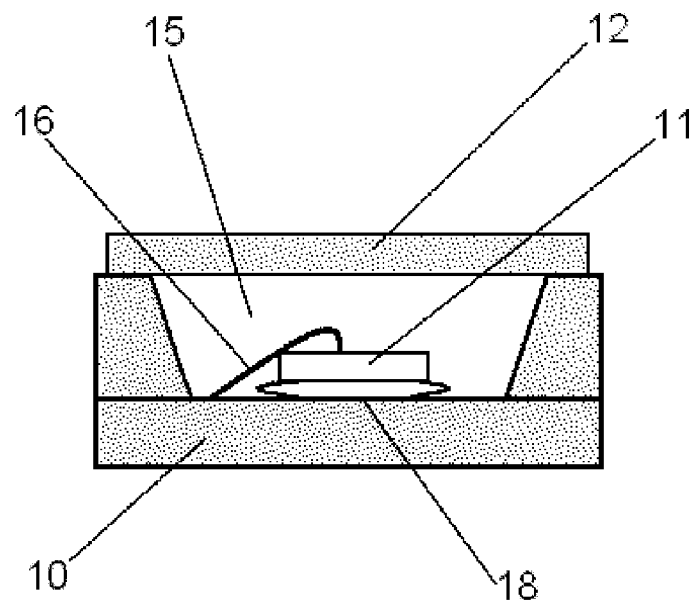
Fig. 1B *[Background Art]*

LIGHT EMISSIVE CERAMIC LAMINATE AND METHOD OF MAKING SAME

CROSS-REFERENCE TO RELATED APPLICATIONS

This application claims the benefit of U.S. Provisional Application No. 61/394,108, filed Oct. 18, 2010, the disclosure of which is herein incorporated by reference in its entirety.

BACKGROUND OF THE INVENTION

1. Field of the Invention

This disclosure relates to luminescent layers suitable for light-emitting devices, such as laminated translucent and transparent ceramic elements and methods for making the same.

2. Description of the Related Art

Solid state light-emitting devices such as light-emitting diodes (LEDs), organic light-emitting diodes (OLEDs) sometimes called organic electroluminescent devices (OELs), and inorganic electroluminescent devices (IEL) have been widely utilized for various applications such as flat panel displays, indicators for various instruments, signboards, and ornamental illuminations, etc. As the emission efficiency of these light-emitting devices continues to improve, applications that require much higher luminance intensity, such as automobile headlights and general lighting, may soon become feasible. For these applications, white LED is one of the promising candidates and has attracted much attention.

Conventional white LED's are manufactured based on a combination of blue LED and yellow light-emitting YAG:Ce phosphor powder used as a wavelength-converting material dispersed in an encapsulant resin such as epoxy and silicone, as disclosed in U.S. Pat. No. 5,998,925 and U.S. Pat. No. 6,069,440. The wavelength-converting material is so disposed as to absorb some part of the blue LED light-emission and re-emit the light at a different wavelength as yellow or green-yellow light. The combination of the blue light from the LED and the green-yellow light from the phosphor results in perceived white light. However, since the particle size of YAG:Ce phosphor powder utilized for this system is around 1-10 μm, the YAG:Ce powder dispersed in the transparent matrix can cause strong light scattering. As a result, a considerable portion of both incident light from the blue LED and yellow light emitted from the YAG:Ce powder ends up being backscattered and dissipated, causing a loss of white light emission.

One solution to this problem is to form a monolithic ceramic member as a wavelength-converting material. The ceramic member can be constituted by plural ceramic layers of single or multiple phosphors, or transparent layers. The transparent ceramic layers may be constituted by, for example, the same host material as the wavelength-converting material, but may be devoid of any dopant (U.S. Pat. No. 7,361,938). These laminated layers may also be in the form of luminescent ceramic cast tapes, which can be laminated and co-fired (U.S. Pat. No. 7,514,721 and U.S. Published Application No. 2009/0108507). However, since these laminated layers are generally formed from garnet powder of low IQE (Internal Quantum Efficiency) produced through solid state reaction or co-precipitation, the present inventors recognized that the resultant luminosity generated by these luminescent layers is poor even though the cost of manufacture is low. Phosphor nanoparticles produced by radio frequency thermal plasma treatment of liquid precursors showed high wavelength conversion efficiency (WO2008/112710) and very well controlled stoichiometry, but generally have high production costs. As a result, monolithic ceramic plates composed entirely of plasma nanoparticles would increase production costs.

As described in U.S. Patent Application Publication 2004/0145308 A1, U.S. Pat. No. 7,361,938 B2, and U.S. Pat. No. 7,514,721 B2, white light emitting LED's using luminescent ceramic as a wavelength converter is a promising configuration for high power white light emitting LED's. A typical device structure is shown in FIGS. 1A and 1B. A submount 10 shown in FIG. 1A has a blue LED 11 mounted thereon, with a ceramic wavelength converter 12 disposed thereon, encapsulated by a protective resin 15. Plural electrical connections 16, in this embodiment in the form of protrusions extending from either the blue LED 11 or submount 10 electrically communicate the blue LED with a power source (not shown). In FIG. 1A, since typical size of LED chip is less than 1 mm×1 mm, the size of wavelength converter 12 is generally about the same size.

As shown in FIG. 1B, the ceramic wavelength converter 12 is spaced apart from but positioned to receive blue light emitted from the blue LED 11. Protective resin 15 is disposed in the space defined between the ceramic wavelength converter 12 and the blue LED 11. Electrical connections 16, in this embodiment in the form of wires, extend into the defined space and electrically communicate the blue LED with the power source. Die bonding 18 conjoins the blue LED 11 to the submount/package 10. In FIG. 1B, the size of luminescent ceramic 12 can be similarly sized in an LED package, but can be less than 10 mm×10 mm, and often, less than 5 mm×5 mm. However, rigid ceramic plates are generally prepared in sizes much larger than these sizes, thus there is a need for them to be diced and cut into such small pieces from a larger prepared ceramic mother plate. Some have attempted to solve this problem by forming green sheets of the pre-sintered ceramic material, then cutting the green sheet. (U.S. Pat. No. 7,361,938; US Published Application 2009/0108507). Some have described notching or punching the tape or stack and then snap breaking the ceramic material (U.S. Pat. No. 7,514,721). In cutting the green sheets, dicing techniques using a diamond blade have been utilized. In this dicing process, dimension accuracy is very important in order to reproduce a consistent white color from so constructed LED. For example, if the size of the luminescent ceramic is larger, the emission color can be yellowish white, whereas if it is smaller, the color can be bluish. Furthermore, these dicing processes are costly and time consuming. In addition, the width of chips lost using a diamond blade is not a negligible loss because the size of the luminescent ceramic itself is so small.

In addition, in the production process of semiconductor devices, semiconductor chips are manufactured by forming a circuit in a large number of areas sectioned by streets (cutting lines) formed on the front surface of a substantially disk-like semiconductor wafer in a lattice form and by dividing the areas having the circuit formed therein along the streets. As a result, various methods and constructs have been described for dicing semiconductor wafers (U.S. Pat. No. 5,169,804; U.S. Pat. No. 7,129,150; U.S. Pat. No. 7,670,872). However, these wafers are not translucent. When these individual translucent ceramics are separated from a larger form, color fluctuations between individual ceramic elements can be discerned among the plural elements. Further, since these semiconductor chips have circuitry formed therein, and manufacturing parameters of circuitry manufacturers, such as exposure time of chips to heat, are different, sufficient guidance for the manufacture of translucent ceramic materials has not yet been provided.

The present inventors recognized that manufacture of plural luminescent ceramic tiles is fraught with functional variations. Thus, the present inventors recognized that there is a need for an effective way to produce plural luminescent ceramic tiles while reducing color variation amongst the produced tiles.

SUMMARY OF THE INVENTION

In some embodiment of this invention, such expensive dicing process can be eliminated without sacrificing white color consistency.

Some embodiments provide a luminescent ceramic construct of a layered laminate (also referred to as "a laminated luminescent ceramic construct") comprising: (i) at least one emissive layer extending in a lateral direction; (ii) at least one non-emissive layer which is substantially transparent and extends in the lateral direction, wherein a bottom layer of the layered laminate is one of the at least one non-emissive layer; and (iii) a plurality of regions as viewed from above separated from each other and defined by a vertical relief gap pattern extending in a thickness direction from a top surface of the layered laminate and through the at least one emissive layer without completely extending through the bottom layer, wherein the layered laminate is breakable by force into a plurality of discrete separable portions along the relief gap pattern. In some embodiments, the separable portions have substantially the same optical characteristics after separation. In some embodiments the relief gap pattern is a regular periodic pattern. In some embodiments, the relief gap pattern is a pattern of rectangular shapes. In some embodiments, the relief gap pattern is a periodic criss-cross pattern. In some embodiments, the at least one non-emissive layer further comprises at least a second non-emissive layer. In some embodiments, the at least one emissive layer comprises a host and a luminescent guest, and wherein the at least one non-emissive layer comprises the same host material without doping. In some embodiments, the at least one emissive layer comprises a host and a luminescent guest, and wherein the at least one non-emissive layer comprises a second non-luminescent phase of the same host material.

Some embodiments provide a method for making a luminescent ceramic construct of a layered laminate, comprising: (a) providing at least one ceramic green sheet of an emissive material extending in a lateral direction; (b) providing at least one ceramic green sheet of a non-emissive material extending in the lateral direction including one separate ceramic green sheet of a non-emissive material; (c) creating on a substrate a green sheet laminate extending in the lateral direction using the at least one ceramic green sheet of the emissive material and the at least one ceramic green sheet of the non-emissive material, if any, except for the one separate ceramic green sheet of the non-emissive material; (d) creating a relief gap pattern as viewed from above within the green sheet laminate, the pattern extending into the green sheet laminate from a top surface thereof to a depth sufficient to extend completely through the green sheet laminate; (e) placing the one separate ceramic green sheet of the non-emissive material on top of the green sheet laminate with the relief gap pattern to provide a layered green sheet laminate; (f) separating the layered green sheet from the substrate; and (g) sintering the layered green sheet laminate to obtain a sintered layered laminate which is a luminescent ceramic construct of a layered laminate, wherein the sintered layered laminate is breakable by force into a plurality of discrete separate portions along the relief gap pattern.

In some embodiments, the at least one green sheet of the non-emissive material includes at least another green sheet of a non-emissive material other than the one separate green sheet of the non-emissive material, and the green sheet laminate is comprised of the at least one green sheet of the emissive material and the at least another green sheet of the non-emissive material. In some embodiments, the creating of the relief gap pattern within the green sheet laminate is preformed by laser etching. In some embodiments, the creating of the relief gap pattern within the green sheet laminate is performed by mechanical cutting. In some embodiments, any of the disclosed methods further comprise separating at least two portions of the layered laminate by breaking by force along the relief gap pattern, wherein the at least two portions are characterized by substantially similar color characteristics. In some embodiments, the layered laminate separates along a separation portion (a portion of destruction or separation) disposed in a sintered layer of the one separate green sheet of the non-emissive material. In some embodiments, the separation portion comprises the non-emissive material. In some embodiments, the separation portion consists essentially of the non-emissive material. In some embodiments, the separation portion consists of the non-emissive material.

Alternatively, in another embodiment, a luminescent ceramic construct of a layered laminate can be made by a method comprising: (A) providing at least one ceramic green sheet of an emissive material extending in a lateral direction; (B) providing at least one ceramic green sheet of a non-emissive material extending in the lateral direction including one bottom ceramic green sheet of a non-emissive material; (C) creating a green sheet laminate extending in the lateral direction using the at least one ceramic green sheet of the emissive material and the at least one ceramic green sheet of the non-emissive material; (D) creating a relief gap pattern as viewed from above within the green sheet laminate, the pattern extending into the green sheet laminate from a top surface thereof to a depth sufficient to extend completely through the at least one ceramic green sheet of the emissive material, but not completely through the bottom ceramic green sheet of the non-emissive material, to provide a layered green sheet laminate; and (E) sintering the layered green sheet laminate to obtain a sintered layered laminate which is a luminescent ceramic construct of a layered laminate, wherein the sintered layered laminate is breakable by force into a plurality of discrete separate portions along the relief gap pattern.

In some embodiments, the at least one green sheet of the non-emissive material includes at least another green sheet of a non-emissive material other than the one bottom ceramic green sheet of the non-emissive material, and the green sheet laminate is comprised of the at least one green sheet of the emissive material, the at least another green sheet of the non-emissive material, and the bottom ceramic green sheet. In some embodiments, the layered laminate separates along a separation portion (a portion of destruction or separation) disposed in a sintered layer of the bottom ceramic green sheet of the non-emissive material. In some embodiments, the separation portion comprises the non-emissive material. In some embodiments, the separation portion consists essentially of the non-emissive material. In some embodiments, the separation portion consists of the non-emissive material.

These and other embodiments are described in greater detail below.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

BRIEF DESCRIPTION OF THE DRAWINGS

These and other features of this invention will now be described with reference to the drawings of preferred embodiments which are intended to illustrate and not to limit the invention. The drawings are oversimplified for illustrative purposes and are not necessarily to scale.

FIGS. 1A and 1B illustrate schematic cross-sectional views of conventional white LED devices.

DETAILED DESCRIPTION

In the present disclosure, in some embodiments, a "layer" refers to a structure extending longitudinally continuously or discontinuously and laid or lying over or under another wherein the structure and the another may or may not have a clear or gradual boundary therebetween, and wherein the structure can be a region having something (e.g., properties, characteristics, material, and/or production process) generally in common. In some embodiments, when the layer refers to a structure derived from a layer, the layer may be referred to as "a layer produced" or simply "a layer", even though the structure no longer has a perceived boundary in the final product. Further, in some embodiments, when the layer refers to a structure having emissive or non-emissive properties, the layer may be referred to as "an emissive region" or "a non-emissive region", regardless of its production process. The boundary between the emissive region and the non-emissive region may not be clear due to diffusion or migration of a dopant in the final product. In some embodiments, one layer can consist of multiple layers. In some embodiments, the boundary of the layer may be defined by its production process, by physical, mechanical, chemical, and/or electrical characteristics near or at the boundary, by logic or theory, by visual observation, or by any other means by which a skilled artisan would appreciate it as a boundary. In the present disclosure, in some embodiments, the terms "top", "bottom", "upper", "lower", "above", "vertical", "lateral", "horizontal", etc. are all relative terms and are not intended to define any absolute directions; i.e., they are used relative to the direction of the particular structures and the meanings can be changed depending upon the direction of the structure at issue. Further, in the present disclosure where conditions and/or structures are not specified, a skilled artisan in the art can readily provide such conditions and/or structures, in view of the present disclosure, as a matter of routine experimentation. Additionally, the numerical values applied in specific examples may be modified by a range of at least ±50%, and may form ranges defined by any two of the values, and the endpoints of the ranges may be included or excluded.

The present invention will be explained below with reference to some embodiments which are not intended to limit the present invention.

Figure 2A:
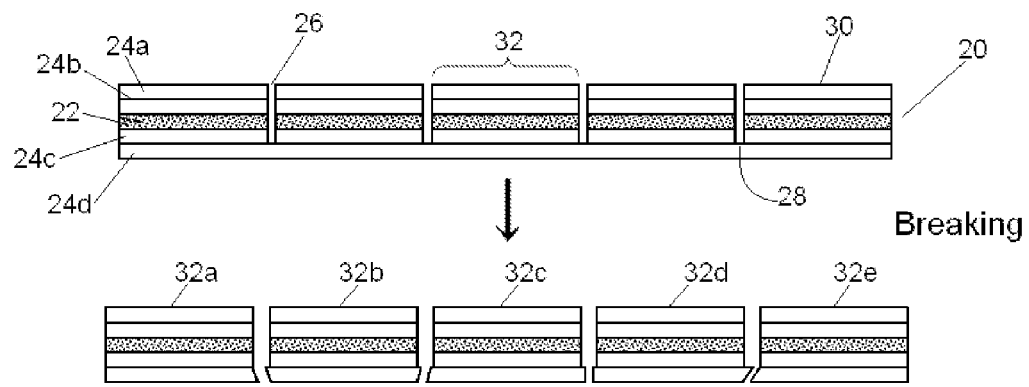
FIG. 2A illustrates a schematic cross-sectional view of an embodiment of a laminated ceramic construct wherein the upper and lower drawings illustrate the construct before and after breaking, respectively, wherein the boundaries shown are imaginary boundaries based on the production process of the construct.

FIG. 2A illustrates a schematic cross sectional view of a laminated ceramic construct according to an embodiment. The upper drawing and lower drawing illustrate structures before and after breaking the construct into multiple individual pieces. As shown in the upper drawing of FIG. 2A, in one embodiment, a laminated ceramic construct 20 is provided, comprising a layered laminate, the laminate further comprising a plurality of layers, the layers comprising at least one emissive layer 22 and at least one non-emissive, substantially transparent layer 24a and 24b ("substantially" will be defined later), the layered laminate having vertical grooves 26 defined therein formed in a relief gap pattern, the grooves having a vertical depth extending from a first surface 30 and completely through the emissive layer 22 and at least partially within the at least one non-emissive layer (completely through the non-emissive layers 24a, 24b, and 24c, but not through the non-emissive layer 24d), the relief gap pattern separating the layered laminate into a plurality of discrete separable portions 32, the separable portions having substantially the same optical characteristics after separation ("substantially" refers to a difference of less than 1%, 5%, or 10% unless otherwise defined). In another embodiment (not shown), the layered laminate having vertical grooves 26 defined therein formed in a relief gap pattern, the grooves having a vertical depth extending from a first surface 30 and completely through the emissive layer 22 and at least partially within the at least one non-emissive layer (completely through the non-emissive layers 24a, 24b, and 24c, and partially through the non-emissive layer 24d).

In another embodiment, a light emitting device is provided which comprises a light source, such as a blue LED 11, and a discrete portion 32 of any of the disclosed laminated construct as the ceramic wavelength converter 12 shown in FIG. 1A or 1B, the discrete portion being separated from the laminated construct array by mechanical deformation, breaking along the vertical relief gap pattern. In some embodiments, grooves extend, in a thickness direction, completely through an emissive layer (the layer 22) and plural non-emissive layers (the layers 24a, 24b, and 24c), but not through a non-emissive bottom layer (the layer 24d) The boundary between the non-emissive layers 24a and 24b may not be perceived after being sintered. However, they are referred to as layers.

Figure 2B:
FIG. 2B illustrates a schematic cross-sectional view of the laminated ceramic construct of FIG. 2A, wherein the boundaries are shown based on the property differences (i.e., emissive or non-emissive regions).

FIG. 2B illustrates a schematic cross-sectional view of the laminated ceramic construct 20, wherein the boundaries are shown based on the property differences (i.e., the emissive region 22 and the non-emissive region 24), not based on the production process, whereas in FIG. 2A, the boundaries shown are imaginary boundaries based on the production process of the construct.

In some embodiments, the gap 26 of the relief gap pattern is about 50 μm to about 500 μm, typically about 100 μm to about 300 μm. In some embodiments, the thickness of each of the individual non-emissive layers, for example 24a, 24b, 24c, etc., produced is substantially the same or different and about 25 μm to about 200 μm, typically about 50 μm to about 100 µm (thickness will also be explained later). Those skilled in the art will recognize that the pre-sintering thickness of the individual layers may decrease, for example about 20%, after sintering. In some embodiments, the number of the non-emissive layers as layers produced above the emissive layer is zero to ten, typically two to five, and the number of the non-emissive layers under the emissive layer, which include a bottom layer, is one to ten, typically two to five, wherein the bottom layer is essential, through which the relief gap pattern does not extend. The thickness of the non-emissive layer(s) as a non-emissive region or regions (as shown in FIG. 2B) can be measured but can also be determined based on the thickness of each non-emissive layer as a layer produced and the number of the non-emissive layer(s). In some embodiments, the thickness of each emissive layer as a layer produced or emissive region is about 15 µm to about 250 µm, about 50 µm to about 200 µm, typically between about 75 µm to about 125 µm. In some embodiments, the number of the emissive layers is one to five, typically one or two. In some embodiments, the non-emissive layers and emissive layers can be stacked in any order.

As shown in the lower drawing of FIG. 2A, application of force to the laminated construct 20 by force along the relief gap pattern constituted by the vertical groove 26 can sever the construct into individual portions 32a, 32b, 32c, 32d, and 32e, providing individual ceramic wavelength converters. The application of force to the laminated construct breaks a separation portion 28 (a portion of destruction or separation), e.g., a portion of the non-emissive layer 24d vertically aligned with the vertical groove 26, formed along the relief gap pattern.

In some embodiments, the at least one transparent non-emissive layer is disposed between the emissive layer and the light source. In some embodiments, at least one, at least two, at least three non-emissive layers are disposed between the light source and the emissive layer 22. While not wanting to be limited by theory, it is believed that providing a non-emissive region 24, for example, the separation portion 28, as the region enabling lateral separation of the array into plural discrete elements, the color variation between the plural separated discrete elements is reduced by maintaining consistent emissive element dimensions and/or reducing chipping of the edge of the emissive region 22 or walls of the defined groove 26. In some embodiments, an additional non-emissive region is disposed on a side of the emissive region 22 opposite to the light source so that the emissive region is disposed between the light source and the additional non-emissive region.

Figure 3:
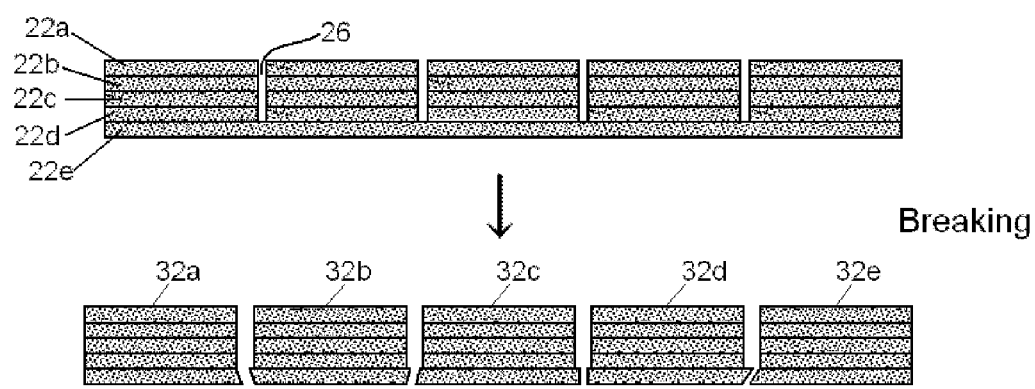
FIG. 3 illustrates a schematic cross-sectional view of a comparative embodiment of a laminated ceramic construct wherein the upper and lower drawings illustrate the construct before and after breaking, respectively.

FIG. 3 illustrates a comparative example, where the plural emissive layers 22a-22e are laminated into an emissive region without a non-emissive region, and grooves 26 are formed in a relief gap pattern through the layers 22a-22d except for the layer 22e as shown in the upper drawing. As shown in the lower drawing of FIG. 3, upon breaking the array to separate the laminate into discrete ceramic elements 32a, 32b, 32c, 32d, and 32e, the color is expected to fluctuate between separate discrete portions of the array.

In some embodiments, a vertical relief gap pattern is defined within the layered laminate or laminated composite. In some embodiments, the vertical relief gap pattern comprises a plurality of grooves formed within the laminated composite. In some embodiments, the plural grooves define a vertical relief gap pattern in the layered laminate such that the laminate is created into an array of plural conjoined emissive composite laminates. In some embodiments, the relief gap pattern has a vertical depth extending from the top surface of the laminate completely through the at least one emissive layer or region. In some embodiments, the groove is defined partially into an at least one non-emissive layer or region, wherein the at least one non-emissive layer or region is disposed between the light source and the emissive layer or region. In some embodiments, the non-emissive layer or region can comprise a plurality of non-emissive sub-layers, the grooves being defined to extend completely through at least a first non-emissive sub-layer and not at all through at least a second non-emissive sub-layer.

The shape and size of the relief gap pattern can vary depending on the production process, the intended application, etc. In some embodiments, the vertical relief gap pattern is a regular periodic pattern as viewed from above. In one embodiment, the relief gap pattern is a pattern of rectangular shapes. In one embodiment, the relief gap pattern is a periodic criss-cross pattern. In one embodiment, the pattern is comprised of straight lines so that the composite is easily breakable by force. The dimension of each separated portion may be in a range of about 0.50 mm to about 30.0 mm. In some embodiments, the separated portion has a square shape with a dimension of typically about 1 mm×about 1 mm to about 30 mm×about 30 mm. In some embodiments, the separated portion can be between about 1 mm×about 1 mm to about 10 mm×about 10 mm. Some examples can be 1 mm×1 mm, 2 mm×2 mm, 3 mm×3 mm, 5 mm×5 mm, and 10 mm×10 mm.

In some embodiments, the plurality of constructs defined by the relief gap pattern further comprises at least a second non-emissive layer as a bottom layer which supports the plurality of constructs thereon.

In some embodiments, the emissive layer comprises a garnet material. The garnet may have a composition $A_3B_5O_{12}$, wherein A and B are independently selected from trivalent metals. In some embodiments, A can be selected from elements including but not limited to: Y, Gd, La, Lu, and Tb; B can be selected from elements including but not limited to: Al, Ga, Si, and In. In some embodiments, the garnet is doped with at least one element preferably a rare earth metal. In some embodiments, the rare earth metal is selected from the group including but not limited to Ce, Gd, La, Tb, Pr, Sm and Eu. Examples of useful phosphors include $Y_3Al_5O_{12}$:Ce, (Y, Tb)$_3Al_5O_{12}$:Ce, $Lu_3Al_5O_{12}$:Ce and (Y, Gd)$_3$(Al, Ga)$_5O_{12}$:Ce; in one embodiment, the phosphor material comprises RF thermal plasma synthesized $Y_3Al_5O_{12}$:Ce$^{3+}$ (YAG:Ce). In some embodiments, the phosphor material can be a non-garnet material, e.g., (Sr, Ca, Ba)$_2SiO_4$:Eu, $Ca_3Sc_2Si_3O_{12}$:Ce, $Ba_3MgSi_2O_8$:Eu, $BaMgAl_{10}O_{17}$:Eu, $La_2O_2S$:Eu, $SrGa_2S_4$:Eu, $CaAlSiN_3$:Eu, $Ca_2Si_5N_8$:Eu, and CaSiAlON:Eu.

The separated portions can be used in applications as shown in FIGS. 1A and 1B and any other suitable applications.

Multiple methods are available for the preparation of emissive materials for phosphors, including wet chemical co-precipitation, hydrothermal synthesis, supercritical synthesis, solid state reaction, combustion, laser pyrolysis, flame spray, spray pyrolysis, and plasma synthesis. Among these processes, flow-based thermochemical synthesis routes such as laser pyrolysis, flame spray, spray pyrolysis and plasma synthesis are especially suitable for industrial scale synthesis of high purity, crystalline defect-free and highly efficient phosphors. Among these processes, plasma synthesis, especially radio frequency (RF) inductively coupled thermal plasma synthesis, leads to exceptionally high purity of end products since no combustible gases (fuels such as methane in flame spray) are used and the products do not come in contact with any electrodes during synthesis. As taught in patent publication WO2008/112710 (the disclosure of which is herein incorporated by reference in its entirety), size-controlled, high purity and high luminous efficiency phosphor particles can be produced by passing a precursor solution in atomized form into the hot zone of an RF thermal plasma torch and thereby nucleating phosphor particles. These particles can then be collected on suitable filter elements. For example, cerium-doped yttrium-aluminum oxide particles can be synthesized using an aqueous solution of stoichiometric quantities of yttrium nitrate, aluminum nitrate, and cerium nitrate by atomizing this solution via two-fluid atomization in the center of an RF plasma torch, thereby evaporating and decomposing the precursors followed by nucleation of Y—Al—O particles. These particles can be extracted from the effluent gases using an appropriate filtering mechanism. The collected particles when subjected to thermal annealing in an appropriate furnace at temperatures above 1000° C. can completely or substantially completely be converted to phase pure cerium-doped yttrium aluminum garnet ($Y_3Al_5O_{12}$) particles with a wavelength conversion efficiency of at least 0.65 when in the form of a ceramic layer or sheet. Dopant levels are determined depending upon the desired application and any person skilled in the art can appreciate that changes of the dopant level can be achieved without undue experimentation and without deviating from the fundamentals of this concept.

In some embodiments, the non-emissive layer comprises a substantially transparent material. Substantially transparent refers to a sintered layer exhibiting a total light transmittance of at least about 70%, at least about 80%, at least about 90%, at least about 95%, at least about 97% of the radiation impinged thereon. In some embodiments the non-emissive layer comprises the same host material as the emissive layer, but without doping, e.g., undoped garnet. In another embodiment, the undoped garnet is selected from other transparent, non-emissive garnet materials, e.g., if YAG:Ce is utilized in the emissive layer, undoped $Lu_3Al_5O_{12}$ can be used in the non-emissive layer. In some embodiments, the non-emissive layer comprises a second non-luminescent phase of the same host material.

The present invention also provides for a method for making a plurality of emissive layer laminates, comprising the steps of providing a ceramic green sheet for emissive or non-emissive ceramic layers; lamination of these green sheets; creating a relief gap pattern within the green sheet laminate, the pattern extending into the green sheet laminate at a sufficient distance to extend in depth beyond the emissive layer and partially into a transparent non-emissive layer; de-bindering and sintering the green sheet laminate; applying sufficient mechanical deformation to the sintered green sheet laminate to sever the sintered green sheet laminate along the relief gap pattern to obtain a plurality of luminescent ceramic tile.

The present invention also provides for a method for making a laminated luminescent ceramic construct, comprising the steps: providing a ceramic green sheet of an emissive material; providing a ceramic green sheet of a non-emissive material; conjoining the emissive and non-emissive layers to create a layered laminate with an emissive region and a non-emissive region; creating a relief gap pattern within the green sheet laminate, the pattern extending into the green sheet laminate at a sufficient distance to extend in depth beyond the emissive region and partially into a translucent non-emissive region; and sintering the green sheet laminate. In some embodiments, the method further includes the step of providing a non-emissive substrate. In some embodiments, the method further includes the step of conjoining the emissive and non-emissive green sheets to the non-emissive substrate. In some embodiments, the method further includes removing the non-emissive substrate from the sintered green sheet laminate. In some embodiments, the step of sintering the green sheet laminate includes sintering the conjoined emissive regions with created relief gap pattern formed therein.

Figure 4:
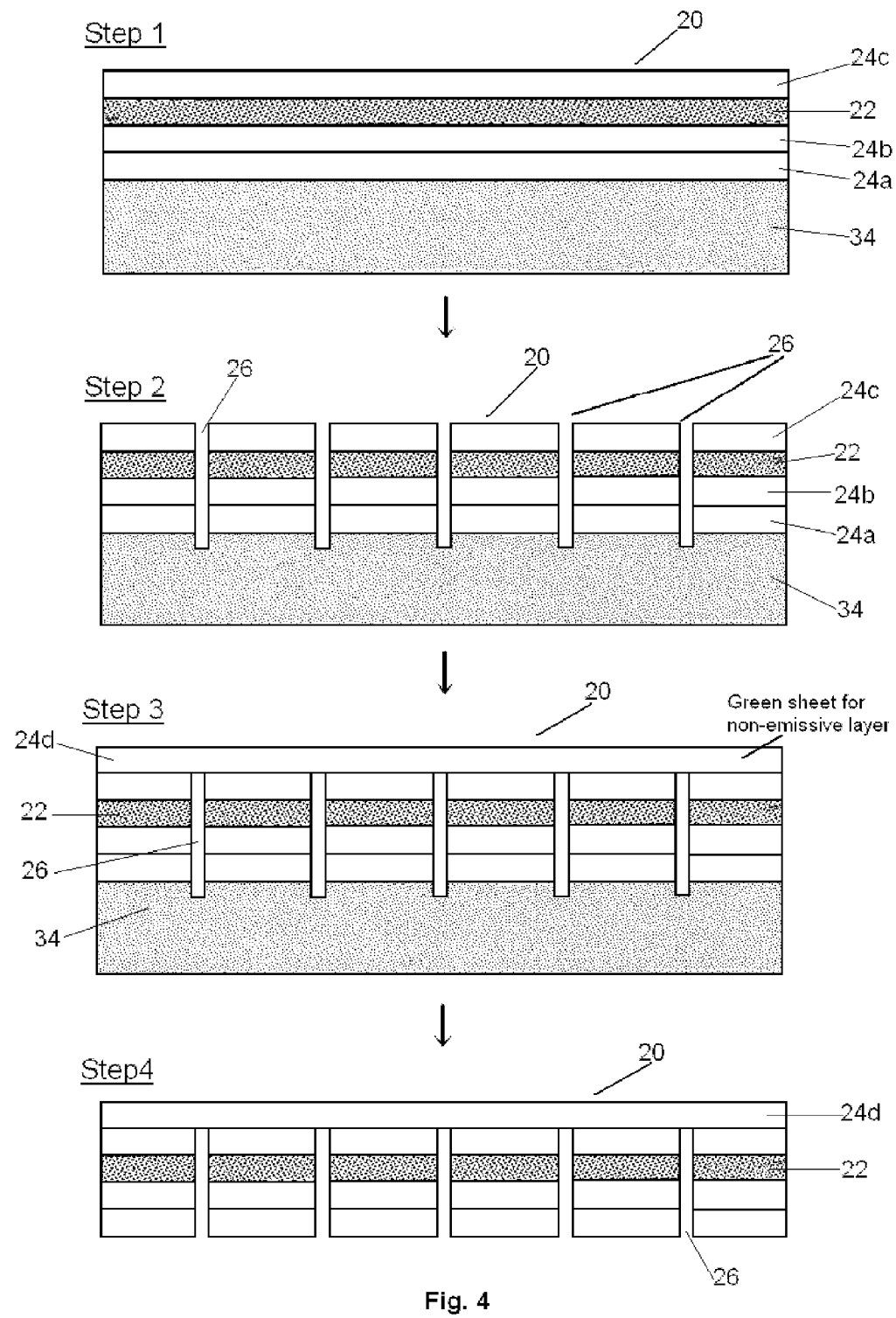
FIG. 4 illustrates an exemplary embodiment of a method of preparing emissive layers disclosed herein.

In some embodiments, the step of providing a ceramic green sheet includes providing a continuous green sheet from a supply roll of material, or creating a continuous green sheet of non-transmissive material or providing separate plural green sheets of the desired type (emissive or non-emissive) in the particular desired vertical order. In the continuous sheet embodiment, while the sheet is being dispensed or moving, a separate layer is disposed atop the first layer, for example as a second green sheet layer dispensed from a continuous roll, as a slurry which can develop into the second layer or as coating of the desired emissive or non-emissive material. FIG. 4 illustrates production processes of a layered laminate according to an embodiment which is not intended to limit the present invention.

As shown in FIG. 4, "Step 1", in some embodiments, the step of providing a ceramic green sheet includes providing plural separate layers, at least one green sheet of a non-emissive material, e.g., non-emissive layers 24a, 24b, and 24c, and at least one green sheet of an emissive material, e.g., emissive layer 22. The plural layers are conjoined, disposed or stacked in the desired order vertically upon a supportive film substrate 34 to create a layered laminate 20 with an emissive region 22 and a non-emissive region 24. Upon sintering, separate discrete layers or green sheets may lose their distinctiveness, wherein dopants or emissive materials may diffuse across the previous distinct interfaces to reduce their distinctiveness. However, if the non-emissive green sheets or non-emissive region thickness is greater than the distance the dopant could diffuse from the emissive layer into the non-emissive layer, e.g., greater than at least about 125 µm, greater than at least about 150 µm, greater than at least about 200 µm for an undoped YAG layer when used in conjunction with a YAG:Ce doped emissive layer, then there will be a non-emissive region in portions of the composite further than those distances from the prior unsintered interface locations. In addition, in some embodiments, non-emissive regions refer to substantially dopant-free regions wherein the dopant concentration is less than about 0.01%, about 0.0075% or less than about 0.005%. In some embodiments, the depth of the grooves 26 defined into the pre-sintered non-emissive layers is greater than the distance the dopant may diffuse into the originally substantially dopant free non-emissive green sheets or layers. A release compound which enables the separation of the substrate from the laminated composite before separation between the plural green sheet layers may optionally have been applied to the supportive contacting surface of the stacked green sheets. Examples of the supportive film substrate include PET. Examples of the release compound include silicon release agents.

As shown in FIG. 4, "Step 2", in some embodiments, the vertical relief grooves 26 are formed within the stacked plural green sheet layers. In some embodiments, the step of creating a relief gap pattern within the green sheet laminate is preformed by laser etching. Laser etching is useful in that the lateral width of the beam can be reduced relative to mechanical cutting elements, reducing the amount of unused material. Furthermore, by selecting the power of the beam or wavelength of laser, highly consistent groove depths and/or groove widths can be formed within the laminated green sheets. By applying a coherent energy source to the green sheets, the material has not yet been made transparent and is better able to absorb the laser energy. In another embodiment, the grooves are formed in the stacked plural green sheets by scribing. The term "scribing" refers to sawing, cutting or slicing the target layer with a sharp object. In another embodiment, the vertical grooves are formed in the plural green sheets by mechanical cutting. In another embodiment, the vertical grooves are created by using pressing a sharp edge by hydraulic press into the stacked green sheets. In another embodiment, the creation of the vertical grooves is performed on the laminated green sheets prior to sintering.

As shown in FIG. 4, "Step 3", in some embodiments, a least one non-cut non-emissive layer 24d is stacked upon the plural green sheets with the vertical relief gap pattern 26 defined therein. In another embodiment, the vertical grooves 26 are formed within the stacked green sheet laminate, and partially into, but not completely through at least one non-emissive layer disposed on the bottom of the stack. In this embodiment, the substrate 34 can be the non-emissive layer which is not cut through, constituting a part of the green sheet laminate, where the non-emissive layer 24d can be eliminated.

As shown in FIG. 4, "Step 4", in some embodiments, the supportive film substrate 34 is removed from contact with the green sheet layer. The resulting multiply-divided green sheet layered composite is subjected to heating and environmental conditions to remove any extraneous remaining materials, including binders and dissolving solvents, and sintered to convert translucent or opaque material phases into the desired transparent or translucent composite laminate.

EXAMPLES

IQE Measurement and Comparison of Powders

The present invention will be explained in detail with reference to Examples which are not intended to limit the present invention.

1. Green Sheet Preparation for Non-Emissive (YAG) Layers for Laminated Composite A 50 ml high purity $Al_2O_3$ ball mill jar was filled with 55 g of $Y_2O_3$-stabilized $ZrO_2$ ball of 3 mm diameter. Then, in a 20 ml glass vial, 0.153 g dispersant (Flowlen G-700. Kyoeisha), 2 ml xylene (Fisher Scientific, Laboratory grade) and 2 ml ethanol (Fisher Scientific, reagent alcohol) were mixed until the dispersant was dissolved completely. The dispersant solution and tetraethoxysilane, as sintering aid (0.038 g, Fluka), were added to a ball mill jar.

$Y_2O_3$ powder (3.984 g, 99.99%, lot N-YT4CP, Nippon Yttrium Company Ltd.) with a BET surface area of 4.6 $m^2/g$ and $Al_2O_3$ powder (2.998 g, 99.99%, grade AKP-30, Sumitomo Chemicals Company Ltd.) with a BET surface area of 6.6 $m^2/g$ were added to ball mill jar. The total powder weight was 7.0 g and the ratio of $Y_2O_3$ to $Al_2O_3$ was at a stoichiometric ratio of 3:5. A first slurry was produced by mixing the $Y_2O_3$ powder, the $Al_2O_3$ powder, dispersant, tetraethoxysilane, xylenes, and ethanol by ball milling for 24 hours.

A solution of binder and plasticizers was prepared by dissolving 3.5 g poly(vinyl butyral-co-vinyl alcohol-co-vinyl acetate) (Aldrich), 1.8 g benzyl n-butyl phthalate (98%, Alfa Aesar), and 1.8 g polyethylene glycol (Mn=400, Aldrich) in 12 ml xylene (Fisher Scientific, Laboratory grade) and 12 ml ethanol (Fisher Scientific, reagent alcohol). A second slurry was produced by adding 4 g of the binder solution into the first slurry and then milling for another 24 hours. When ball milling was complete, the second slurry was passed through a syringe-aided metal screen filter with pore size of 0.05 mm. Viscosity of the second slurry was adjusted to 400 centipoise (cP) by evaporating solvents in the slurry while stifling at room temperature. The slurry was then cast on a releasing substrate, e.g., silicone coated Mylar® carrier substrate (Tape Casting Warehouse) with an adjustable film applicator (Paul N. Gardner Company, Inc.) at a cast rate of 30 cm/min. The blade gap on the film applicator was set at 0.38 mm (15 mil). The cast tape was dried overnight at ambient atmosphere to produce a green sheet of about 95 μm thickness. Finally, the green sheet was peeled off from the substrate and cut into four sheets of 30 mm×30 mm sized green sheet.

2. Green Sheet Preparation for Emissive (YAG:Ce) Layers for Laminated Composite

A green sheet with 30 mm×30 mm×95 μm was prepared by using the same preparation procedure described in section 1 above other than using different raw material composition of 3.959 g $Y_2O_3$ powder, 2.994 g $Al_2O_3$ powder, and 0.077 g Cerium (III) nitrate hexahydrate (99.99% pure, Sigma-Aldrich).

3. Preparation of Laminated Green Sheet and Sintering

The obtained four green sheets were stacked onto a carrier substrate in a particular order of non-emissive layer/non-emissive layer/emissive layer/non-emissive layer, followed by 90° C.-heated compression in a hydraulic press at a uniaxial pressure of 8 metric tons and held at that pressure for 5 minutes. Laminated composites of three non-emissive and one emissive layer were thus produced. 2 mm×2 mm square grid incisions over 30 mm on a side were made by using a sharp razor blade through the three non-emissive layers up to about halfway through or into the carrier substrate. Then, one more green sheet for a non-emissive layer was put onto the laminated composite with incisions, followed by the same uniaxial hydraulic press to laminate an additional un-patterned green sheet to the pattern-cut laminated composite. The carrier substrate with silicone releasing coating was carefully removed from the laminated green sheets.

For debindering, the laminated green sheets were sandwiched between $ZrO_2$ cover plates (1 mm in thickness, grade 42510-X, ESL Electroscience Inc.) and placed on an $Al_2O_3$ plate of 5 mm thick; then heated in a tube furnace in air at a ramp rate of 0.5° C./min to 600° C. and held for 2 hours to remove the organic components from the green sheets to generate preforms.

After debindering, the preforms were annealed at 1500° C. in a vacuum of $10^{-1}$ Torr for 5 hours at a heating rate of 1° C./min to produce ceramic with YAG phase.

Following the first annealing, the preforms were further sintered in a vacuum of $10^{-3}$ Torr at about 1650° C. for 2 hours at a heating rate of 5° C./min and a cooling rate of 10° C./min to room temperature to produce a translucent YAG ceramic sheet of about 0.38 mm thickness with about 1.6 mm×1.6 mm square grid rabbet. The obtained ceramic sheet was yellow but slightly brownish. In order to eliminate the brownish stain, sintered ceramic sheets were reoxidized in a furnace under vacuum of $10^{-1}$ Torr at 1400° C. for 2 hrs at heating and cooling rates of 10° C./min and 20° C./min respectively. The sintered laminated composite showed brilliant yellow color and exhibited transmittance greater than 70% at 800 nm. When irradiated with a blue LED with a peak emission wavelength at 455 nm, a clear boundary between emissive and non-emissive layers could be observed by optical microscope, which indicated that no significant diffusion of cerium occurred from the doped emissive layer to the non-doped YAG layer.

This ceramic sheet was able to be broken into square tiles along the rabbet by using a sharp edge relatively easily. Finally, 169 ceramic tiles with about 16 mm×16 mm square size were prepared.

It will be appreciated by those skilled in the art that various omissions, additions and modifications may be made to the processes described above without departing from the scope of the invention, and all such modifications and changes are intended to fall within the scope of the invention.

What is claimed is:

1. A luminescent ceramic construct of a layered laminate comprising:
   at least one emissive layer extending in a lateral direction;
   at least one non-emissive layer which is substantially transparent and extends in the lateral direction, wherein a bottom layer of the layered laminate is one of the at least one non-emissive layer; and
   a plurality of regions as viewed from above separated from each other and defined by a vertical relief gap pattern, the relief gap pattern extending in a thickness direction from a top surface of the layered laminate and through the at least one emissive layer without completely extending through the bottom layer, wherein the layered laminate is breakable by force into a plurality of discrete separable portions along the relief gap pattern,
   wherein all non-emissive layers contacting the at least one emissive layer have a thickness of more than 125 μm.

2. The luminescent ceramic construct of claim 1, wherein the relief gap pattern is a regular periodic pattern.

3. The luminescent ceramic construct of claim 2, wherein the relief gap pattern is a pattern of rectangular shapes.

4. The luminescent ceramic construct of claim 3, wherein the relief gap pattern is a periodic criss-cross pattern.

5. The luminescent ceramic construct of claim 1, wherein the at least one non-emissive layer further comprises at least a second non-emissive layer.

6. The luminescent ceramic construct of claim 1, wherein the at least one emissive layer comprises a host and a luminescent guest, and wherein the at least one non-emissive layer comprises the same host material without doping.

7. The luminescent ceramic construct of claim 1, wherein the at least one emissive layer comprises a host and a luminescent guest, and wherein the at least one non-emissive layer comprises a second non-luminescent phase of the same host material.

* * * * *